United States Patent Office 3,373,184
Patented Mar. 12, 1968

3,373,184
SULFAMIDE DERIVATIVES
Milton Wolf, West Chester, Pa., assignor to American Home Products Corporation, New York, N.Y., a corporation of Delaware
No Drawing. Filed Sept. 24, 1965, Ser. No. 490,083
15 Claims. (Cl. 260—465.4)

This invention relates to new and useful sulfamide derivatives as well as to a novel method for their preparation. In particular, the present invention is concerned with sulfamylaminomalonates, sulfamylaminocyanoacetates and sulfamylaminomalononitriles having pharmacodynamic activity.

The novel compounds which are included within the scope of this invention are represented by the following formula:

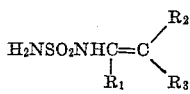

wherein $R_1$ is selected from the group consisting of hydrogen and lower alkyl; and $R_2$ and $R_3$ are selected from the group consisting of cyano and carboxy-(lower)alkyl.

The new compounds of the aforesaid formula where $R_2$ and $R_3$ are both carboxy(lower)alkyl, properly are called "sulfamylaminomalonates." Typical examples thereof are: diethyl-N-sulfamylaminomethylenemalonate and diethyl-N-sulfamylaminoethylidenemalonate. Alternately, when $R_2$ is cyano and $R_3$ is carboxy(lower)alkyl, the compounds are called "sulfamylaminocyanoacetates" such as, ethyl-N-sulfamylaminomethylenecyanoacetate and methyl-N-sulfamylaminopropylidenecyanoacetates. Those compounds of the above formula where $R_2$ and $R_3$ are both cyano are "sulfamylaminomalononitriles," for example, N-sulfamylaminomethylenemalononitrile, N-sulfamylaminopropylidenemalononitrile and N-sulfamylaminoethylidenemalononitrile.

In accord with the present invention, the aforementioned sulfamylaminomalonates, sulfamylaminocyanoacetates and sulfamylaminomalononitriles have been found to possess interesting pharmaceutical properties which render them useful as synthetic medicinals. More particularly, these compounds are central nervous system depressants which exhibit utility as potent anticonvulsants.

In accord with the process of the present invention, the compounds of this invention may be prepared by the reaction of an ether of the formula:

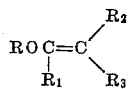

where $R_1$, $R_2$ and $R_3$ have the same meaning as previously set forth and R is lower alkyl; with sulfamide. The reaction is effected by heating a substantially equimolar mixture of the reactants in a reaction-inert organic solvent at a temperature from about 30° C. to about 100° C. for a period from about one to twenty-four hours. Preferably, this reaction is conducted in the presence of sodium dissolved in absolute ethanol at the reflux temperature of the reaction mixture for a period of three to seven hours. By reaction-inert organic solvent as employed herein is meant an organic solvent which dissolves the reactants and will not prevent or interfere with their interaction. The majority of the reactants employed in the process of this invention are known compounds which are readily available from commercial sources, while the remainder can easily be prepared in accordance with standard organic procedures well known to those skilled in the art.

After the reaction is complete, the reaction mixture is cooled, extracted with an immiscible organic solvent, such as ether, and acidified by the addition of an acid. Thereafter, the product is obtained by conventional methods such as extraction, concentration and crystallization.

In accord with the above described process, the reactants listed in Table I are reacted with sulfamide to produce the corresponding products.

Table I
Reactant:
    A dialkyl alkoxyalkylidenemalonate,
    An alkyl alkoxyalkylidenecyanoacetate,
    An alkoxyalkylidenemalononitrile.
Product:
    A dialkyl-N-sulfamylaminoalkylidenemalonate,
    An alkyl-N-sulfamylaminoalkylidenecyanoacetate,
    An N-sulfamylaminoalkylidenemalononitrile.

When the compounds of this invention are employed as anticonvulsants, they may be administered alone or in combination with pharmaceutical carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1.0 mg. to about 100.0 mg. per kg. of body weight per day, although as aforementioned variations will occur. However, a dosage level that is in the range of from about 5.0 mg. to about 50.0 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I

A solution of sodium (2.53 g.) in absolute ethanol (100 ml.) is prepared, and sulfamide (9.6 g.) is added, followed by a solution of diethyl ethoxymethylenemalonate (21.6 g.). The reaction mixture is refluxed for four hours, the solvent removed in vacuo, and the residue (40 g. of yellow solid) dissolved in water (100 ml.). The solution is extracted with ether and then acidified with 6 N hydrochloric. The acidified solution is extracted with ether (3× 100 ml.), and the combined extracts washed with saturated salt solution, dryed over anhydrous sodium sulfate, and concentrated to dryness. The residue is triturated with ether affording colorless crystals (4.2 g., 18.9%), M.P. 146.5–8° C. (uncorr.); recrystallization from toluene gives colorless needles of diethyl-N-sulfamylaminomethylenemalonate, M.P. 147–8° C.

Analysis.—Calcd. for $C_8H_{14}N_2O_6S$: C, 36.09; H, 5.30; N, 10.52; S, 1204. Found: C, 36.23; H, 5.02; N, 10.83; S, 12.05.

In a similar manner, dimethyl-N-sulfamylaminomethylenemalonate and methyl, ethyl-N-sulfamylaminoethylenemalonate are prepared.

EXAMPLE II

A solution containing 5.0 g. of sodium in 200 ml. of absolute ethanol is added to 19.2 g. of sulfamide. This mixture is then admixed with 33.8 g. of ethyl ethoxymethylenecyanoacetate and refluxed for five hours. The solvent is removed by vacuum evaporation, and the residue dissolved in 200 ml. of distilled water. The resulting solution is extracted three times with 100 ml. of ether and acidified with 6 N hydrochloric acid. The acidified solution is extracted with ether and the combined extracts are washed with a saturated sodium chloride solution, dried over anhydrous sodium sulfate, and concentrated to dryness. The residue is triturated with ether, thereby producing colorless crystals of ethyl-N-sulfamylaminomethylenecyanoacetate.

Similarly, reacting sulfamide with an appropriate cyanoacetate the following compounds are produced:

Hexyl-N-sulfamylaminomethylenecyanoacetate,
Propyl-N-sulfamylaminomethylenecyanoacetate,
Methyl-N-sulfamylaminopropylidenecyanoacetate,
Butyl-N-sulfamylaminopentylidenecyanoacetate.

EXAMPLE III

A solution of sodium (2.53 g.) in absolute ethanol (100 ml.) is prepared, and sulfamide (9.6 g.) is added, followed by a solution of diethyl ethoxyethylidenemalonate (23.0 g.). The reaction mixture is refluxed for four hours, the solvent removed in vacuo, and the residue dissolved in water (100 ml.). The solution is extracted with ether and then acidified with 6 N hydrochloric. The acidified solution is extracted with ether (3× 100 ml.), the combined extracts washed with saturated salt solution, dried over anhydrous sodium sulftae, and concentrated to dryness. The residue is triturated with ether affording colorless crystals of diethyl-N-sulfamylaminoethylidenemalonate.

In a similar manner, dipropyl-N-sulfamylaminoethylidenemalonate and methyl, pentyl-N-sulfamylaminoheptylidenemalonate are synthesized.

EXAMPLE IV

The procedure described in the foregoing examples is repeated reacting sulfamide with an appropriate malonitrile and the following corresponding products are obtained:

N-sulfamylaminomethylenemalononitrile,
N-sulfamylaminopropylidenemalononitrile,
N-sulfamylaminoethylidenemalononitrile.

What is claimed is:
1. A compound selected from the group consisting of those having the formula:

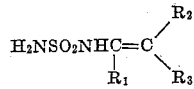

wherein $R_1$ is selected from the group consisting of hydrogen and lower alkyl; and $R_2$ and $R_3$ are selected from the group consisting of cyano and carboxy(lower)alkyl.
2. Ethyl-N-sulfamylaminomethylenecyanoacetate.
3. Propyl-N-sulfamylaminomethylenecyanoacetate.
4. Methyl-N-sulfamylaminopropylidenecyanoacetate.
5. N-sulfamylaminomethylenemalononitrile.
6. N-sulfamylaminoethylidenemalononitrile.
7. A compound selected from the group consisting of those having the formula:

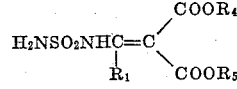

wherein $R_1$ is selected from the group consisting of hydrogen and lower alkyl; and $R_4$ and $R_5$ are lower alkyl.
8. Diethyl-N-sulfamylaminomethylenemalonate.
9. Dimethyl-N-sulfamylaminomethylenemalonate.
10. Dipropyl-N-sulfamylaminoethylidenemalonate.
11. Methyl, ethyl - N - sulfamylaminomethylenemalonate.
12. Diethyl-N-sulfamylaminoethylidinemalonate.
13. A process for the production of a compound of the formula:

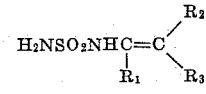

wherein $R_1$ is selected from the group consisting of hydrogen and lower alkyl; and $R_2$ and $R_3$ are selected from the group consisting of cyano and carboxy(lower)alkyl, which comprises contacting a compound of the formula:

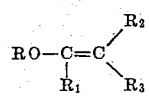

where $R_1$, $R_2$ and $R_3$ are defined as above; and R is lower alkyl, with sulfamide, in a reaction-inert organic solvent at a temperature that is in the range from about 30° C. to about 100° C. for a period from about one to about twenty-four hours.
14. A process as claimed in claim 13 wherein the reaction-inert organic solvent is ethanol.
15. A process as claimed in claim 14 wherein the reaction is conducted at the reflux temperature of the reaction mixture.

References Cited
UNITED STATES PATENTS
3,309,396  3/1967  Shulgin _____ 260—465.5

JOSEPH P. BRUST, *Primary Examiner.*